E. W. PETTER.
PISTON PACKING RING.
APPLICATION FILED AUG. 4, 1908.
929,484.
Patented July 27, 1909.
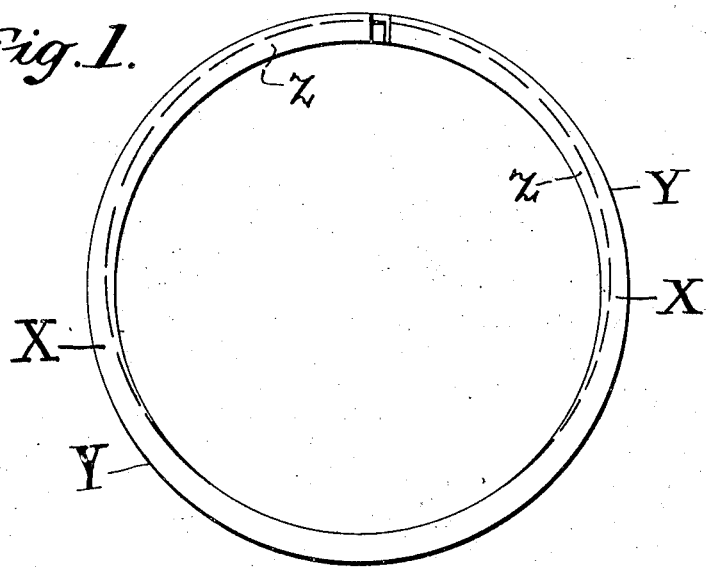
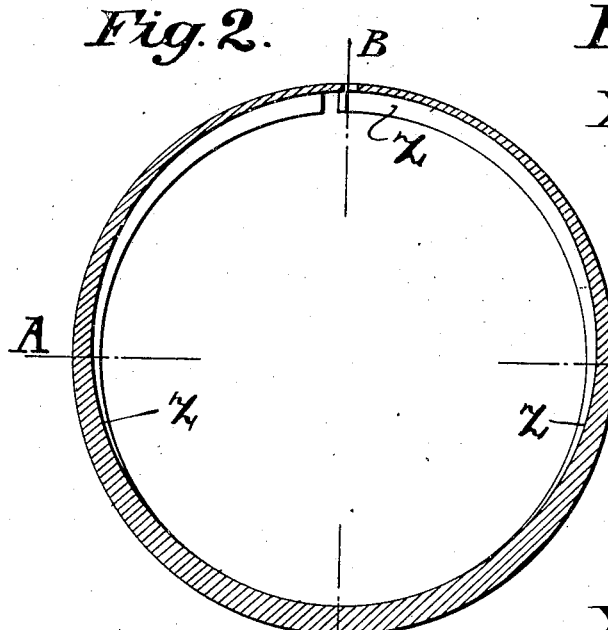
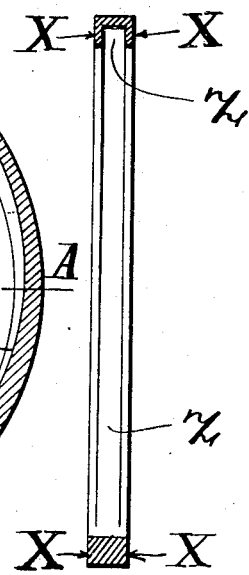
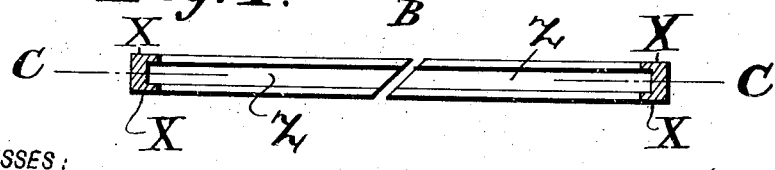
WITNESSES:
INVENTOR
Ernest Willoughby Petter
BY
ATTORNEYS.

UNITED STATES PATENT OFFICE.

ERNEST W. PETTER, OF LONDON, ENGLAND.

PISTON PACKING-RING.

No. 929,484.      Specification of Letters Patent.      Patented July 27, 1909.

Application filed August 4, 1908. Serial No. 446,950.

*To all whom it may concern:*

Be it known that I, ERNEST WILLOUGHBY PETTER, mechanical engineer, a subject of the King of Great Britain, residing at London, England, have invented certain new and useful Improvements in Piston Packing-Rings, of which the following is a specification.

This invention relates to improvements in piston rings or expansion rings for use in steam engines, internal combustion engines and pumps or for analogous purposes and has for its object the provision of a ring which shall overcome many of the drawbacks and disadvantages to which rings as heretofore constructed are liable.

In piston rings of the type commonly used for the cylinders of reciprocating steam engines, reciprocating pumps, internal combustion engines, and other similar machinery, the ring is usually of some suitable and elastic metal such as phosphor bronze or cast iron and is turned cylindrically of somewhat larger diameter than the bore of the cylinder. It is then usually cut across and a portion of the metal removed at the place where the cut occurs so as to permit the ring to close up to the correct diameter of the cylinder, but when it is thus closed up it is not a true circle on the outside. It is, therefore, held in this closed-up position in a chuck, and turned or ground again on the outside so as to be made a true circle of the exact diameter of the cylinder, and in addition to this when released from the chuck it has the property of being able to spring open or exert radial pressure outward. Now, if the ring be the same thickness all around the outward pressure exerted will not be evenly distributed, but will be excessive at the part where the ring is cut open and least at the part opposite to this. One method of overcoming this drawback has been to turn the ring eccentrically on the inside so as to make it thinner at the part where it is cut open and thicker at the opposite part; but a ring made according to this method has many disadvantages of which the following are some:—(1) There is excessive side wear on the ring. (2) The ring is liable to cut and wear the piston and cylinder. (3) The ring is liable to jump over its stop—for example if a small pin or peg is used. There are other disadvantages which it is not necessary to refer to here in detail.

Now my invention is (*inter alia*) designed to overcome the said disadvantages or drawbacks in such rings as heretofore constructed, and in order to effect this I cut or turn or form the interior surface of my ring with an eccentric groove or grooves therein in such a way as to regulate the mass of metal at various points of the ring so that the greatest mass is at the point farthest distant from the split or division and the least mass at the said point of division and nevertheless so as not to interfere with the radial thickness of the ring on one or both lateral surfaces thereof.

My invention may of course be applied to other rings than piston rings where suitable, for instance it may be applied to other expansion rings such for example as are employed as packing rings in other types of engines besides reciprocating engines.

I give the following as an example of one mode of carrying my invention into practice in the case of a piston ring, the same being split or divided as usual. On the interior surface (*i. e.* the inside circumference) of the piston ring I cut or turn or form a groove medially on the surface and of a width say about half (or more or less) the width of the said interior surface the said groove being of graduated or varying depth; the greatest depth being at the point where the ring is cut or divided and from this point of greatest depth the groove grows shallower on each side until at a point opposite the split or division the groove is at its shallowest or there is no groove at all.

The annexed drawing illustrates an example of a piston ring according to this invention; Figure 1 being a plan view of the ring; Fig. 2 a vertical plane section through the middle of the ring; Fig. 3 a section on line B—B of Fig. 2; and Fig. 4 a section on line A—A of Fig. 2.

The ring Y according to this invention, as illustrated, is machined inside and outside concentrically and is provided with an eccentric groove Z on the interior circumference of the ring so as to leave the lateral surfaces X X of the ring intact, obtaining at the same time a variable section of the radial thickness of the ring Y.

As an example of one mode of manufacture of this ring I may proceed as follows:— A cylindrical tubular casting is made of sufficient length to form a number of the piston rings; this casting is then turned (machined)

on its outside to a circumference larger than the internal diameter of the cylinder in which it is intended to use the rings, this casting is then divided up into the individual piston rings and each of the latter is then split and the split ring chucked and turned (machined) again to the final diameter to be given same and then it has the aforesaid eccentric groove (or grooves) cut in the surface of the interior circumference thereof according to this invention. Or, if desired, the eccentric groove or grooves may be formed in the surface of the interior circumference of said ring before the exterior is turned or finished or concurrently therewith and either before or after splitting the ring or before or after the aforesaid casting is divided up into the individual rings, as desired.

What I claim is:—

1. An expansion-ring having a split therethrough and a tapering groove in its inner face and in the plane of the expansion-ring.

2. An expansion-ring having a crescent-shaped groove in its inner face said ring being split at the deepest part of the groove.

3. An expansion ring having its outer and its lateral faces of substantially constant width throughout and provided in its inner face with a crescent-shaped empty groove extending nearly completely around said inner face, said ring being split through at the deepest part of the groove.

In witness whereof I have hereunto set my hand in presence of two witnesses.

ERNEST W. PETTER.

Witnesses:
H. D. JAMESON,
F. L. RAND.